(12) United States Patent
Snyder et al.

(10) Patent No.: US 11,947,006 B1
(45) Date of Patent: Apr. 2, 2024

(54) SYSTEMS AND METHODS FOR THE LOCALIZATION OF OBJECTS BURIED IN THE SEABED

(71) Applicant: The United States of America as represented by the Secretary of the Navy, Keyport, WA (US)

(72) Inventors: Wendy E Snyder, Bremerton, WA (US); Forrest N French, Poulsbo, WA (US); Stephen John Leahu, Poulsbo, WA (US)

( * ) Notice: Subject to any disclaimer, the term of this patent is extended or adjusted under 35 U.S.C. 154(b) by 404 days.

(21) Appl. No.: 17/531,704

(22) Filed: Nov. 19, 2021

Related U.S. Application Data

(60) Provisional application No. 63/205,197, filed on Nov. 19, 2020.

(51) Int. Cl.
| | | |
|---|---|---|
| G01S 15/89 | (2006.01) | |
| B63G 8/00 | (2006.01) | |
| G01S 15/10 | (2006.01) | |

(52) U.S. Cl.
CPC .......... *G01S 15/8902* (2013.01); *B63G 8/001* (2013.01); *G01S 15/101* (2013.01); *B63G 2008/002* (2013.01)

(58) Field of Classification Search
CPC ... G01S 15/8902; G01S 15/101; B63G 8/001; B63G 2008/002
See application file for complete search history.

(56) References Cited

U.S. PATENT DOCUMENTS

| | | | |
|---|---|---|---|
| 5,708,626 A | 1/1998 | Hrubes | |
| 8,868,268 B2 | 10/2014 | Sanders | |
| 9,432,637 B2 | 8/2016 | Bourgeois | |
| 10,640,177 B1 * | 5/2020 | Robertson | ............... B63B 22/18 |
| 2017/0301098 A1 * | 10/2017 | Sadjadi | ..................... G01P 3/38 |

(Continued)

OTHER PUBLICATIONS

W.A. Kuperman and Karim Sabra, Multi-Static Detection and Localization of Buried Targets using Synthetic Aperture Iterative Time-Reversal Processing, Marine Physical Laboratory of the Scripps Institution of Oceanography, Sep. 30, 2007, 6 pages, University of California, San Diego, La Jolla, California.

(Continued)

*Primary Examiner* — Stephen P Avila
(74) *Attorney, Agent, or Firm* — Stephen J. Leahu; Naval Undersea Warfare Center

(57) ABSTRACT

Systems and methods are provided to detect and identify targeted objects buried in the seabed. A targeted area of the seabed may be scanned with a sub-bottom profiler based on predetermined parameters. A localization engine may model the sub-bottom profiler data using a Levenberg-Marquardt non-linear least squares determination. Distance measurements may be extracted based on the modeled data, including a vertical range based on a slant range measured from the sub-bottom profiler to the closest points on the exterior of the targeted objects. The location of the targeted objects may be based on the extracted measurements. In some embodiments, the sub-bottom profiler may be mounted on an unmanned underwater vehicle having thrusters to navigate the vehicle toward the targeted area to excavate and sidescan the targets object.

10 Claims, 9 Drawing Sheets

(56) References Cited

U.S. PATENT DOCUMENTS

2021/0179242 A1    6/2021  Seeley

OTHER PUBLICATIONS

Minglei Guan, Yaxin Cheng, Qingquan Li, Chisheng Wang, Xu Fang, and Jianwei Yu, An Effective Method for Submarine Buried Pipeline Detection via Multi-Sensor Data Fusion, IEEE Access, Sep. 16, 2019, pp. 125300-125309, vol. 7, Institute of Electrical and Electronics Engineers, Piscataway, New Jersey.

Daniel C. Brown, Shawn F. Brown, and Cale F. Brownstead, Simulation and Testing Results for a Sub-bottom Imaging Sonar, Applied Research Laboratory, Oct. 4, 2018, 10 pages, issue 1809.08459, vol. 2, Cornell University, arXiv, Electrical Engineering and Systems Science, Ithaca, New York.

\* cited by examiner $F(x,y,z,\theta,\phi) = Rm^2 - Rs^2 = [Z_{max} - dep]^2 - [(x + t_j*\sin(\theta)*\cos(\phi) - x_{v,j})^2 + (y + t_j*\cos(\theta)*\cos(\phi) - y_{v,j})^2 + (z + t_j*\sin(\phi) - dep_j)^2] = 0$

FIG. 8

Derivative Matrix:

$$dF_k = \begin{bmatrix} \frac{\partial F_1}{\partial x} & \frac{\partial F_1}{\partial y} & \frac{\partial F_1}{\partial z} & \frac{\partial F_1}{\partial \theta} & \frac{\partial F_1}{\partial \varphi} \\ \vdots & \vdots & \vdots & \vdots & \vdots \\ \frac{\partial F_n}{\partial x} & \frac{\partial F_n}{\partial y} & \frac{\partial F_n}{\partial z} & \frac{\partial F_n}{\partial \theta} & \frac{\partial F_n}{\partial \varphi} \end{bmatrix}\Bigg|_{X=X_k}$$

$$\frac{\partial F_i}{\partial x} = -2(x + t*\sin(\theta)*\cos(\varphi) - x_v)$$

$$\frac{\partial F_i}{\partial y} = -2(y + t*\cos(\theta)*\cos(\varphi) - y_v)$$

$$\frac{\partial F_i}{\partial z} = -2(z + t*\sin(\varphi) - dep)$$

$$\frac{\partial F_i}{\partial \theta} = \frac{\partial F_i}{\partial x}(t*\cos(\theta)*\cos(\varphi)) - \frac{\partial F_i}{\partial y}(t*\sin(\theta)*\cos(\varphi))$$

$$\frac{\partial F_i}{\partial \varphi} = -\frac{\partial F_i}{\partial x}(t*\sin(\theta)*\sin(\varphi)) - \frac{\partial F_i}{\partial y}(t*\cos(\theta)*\sin(\varphi)) + \frac{\partial F_i}{\partial z}(t*\cos(\varphi))$$

FIG. 9

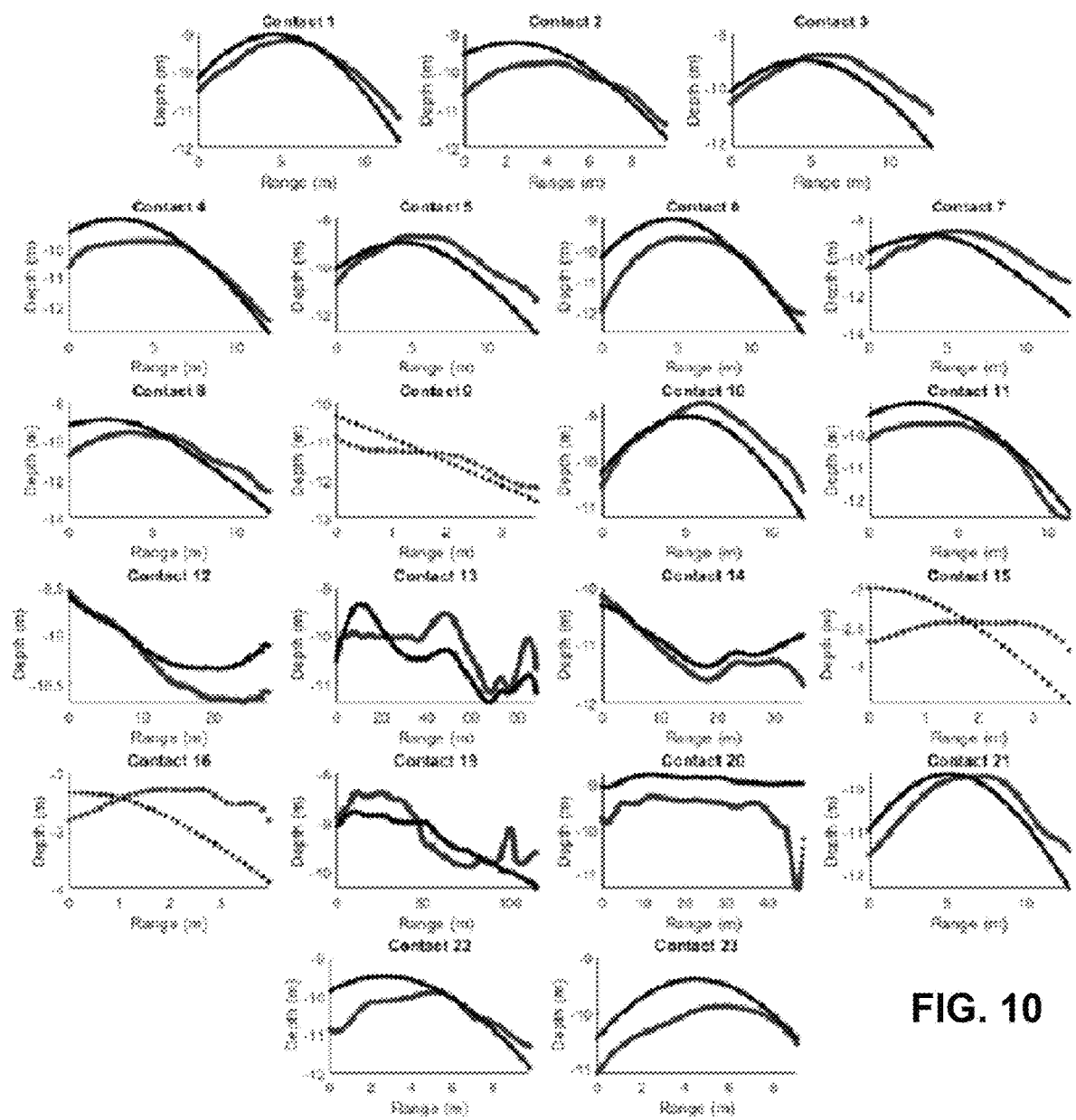
FIG. 10
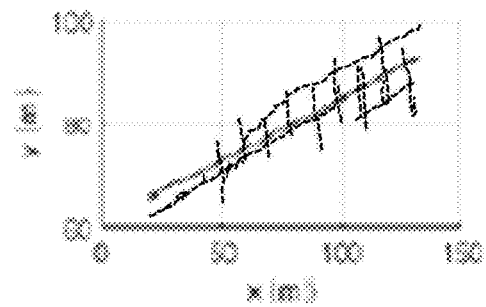
FIG. 11
FIG. 12

SYSTEMS AND METHODS FOR THE LOCALIZATION OF OBJECTS BURIED IN THE SEABED

CROSS REFERENCE TO RELATED APPLICATION

This non-provisional patent application claims priority to, and incorporates herein by reference, U.S. Provisional Patent Application No. 63/205,197 that was filed Nov. 19, 2020.

STATEMENT OF GOVERNMENT INTEREST

The embodiments of the present disclosure may be manufactured and used by or for the Government of the United States of America for governmental purposes without the payment of any royalties thereon or therefor.

FIELD OF THE DISCLOSURE

The present disclosure relates in general to the fields of buried object detection and identification, and in particular to systems and methods for the localization of objects buried in the seafloor or seabed.

BACKGROUND

Basic techniques and devices for searching and identifying buried objects are known in the art. Ground penetrating radar ("GPR"), acoustic arrays, sidescans and visual inspection are used when permitted under limited circumstances. Some of these options are insufficient to find objects, such as cables or wreckages or pipes, buried under sea water due to the aquatic and saline nature of the environment. Further, many of these options require that a certain portion of the object to be visible and accessible.

For example, ground penetrating radar is incapable of scanning through the seafloor or sea sediments because the radar does not operate underwater, specifically saline water such as sea water. Saline water is conductive and leads to inaccurate or unusable readings.

Acoustic arrays require the use of several acoustic microphones and transducers. Such systems are complex and expensive, and take an extensive amount of time to set-up and operate. Due to their complexity and multiple points of failure, the arrays often render the entire system unreliable.

Sidescans are only usable if a portion of the object is not buried by sediment, as such techniques are inadequate to penetrate the seafloor for detecting a completely buried object. Methods that rely only on least-square regression techniques insufficiently utilize only one data point. Visual inspections inherently have many shortcomings, including the inaccessibility of the object buried in the seafloor. Additionally, there is commonly too much data for a human to inspect so that not all of the data is used to properly identify a buried object. Human inspection may also be influenced by artifacts and prior inferences, leading to false interpretations.

As such, traditional approaches may not ensure sufficient identification of a buried object. Further, conventional systems for scanning the seafloor do not provide useful and reliable data. Improved solutions are desired to automatically find and identify buried objects in sea waters. Accordingly, there is a need for automatic systems and methods to more efficiently and effectively identify objects buried beneath the seafloor. Features of the present disclosure overcome various deficiencies of the prior art by providing a device having advantages that will become apparent from the following disclosure.

BRIEF SUMMARY OF THE DISCLOSURE

The following presents a simplified summary of the disclosure in order to provide a basic understanding of some aspects of the disclosure. This summary is not an extensive overview of the disclosure. It is intended neither to identify key or critical elements of the disclosure, nor to delineate the scope of the disclosure. Its sole purpose is to present some concepts, in accordance with the disclosure, in a simplified form as a prelude to the more detailed description presented herein.

According to one technical advantage, the disclosed systems and methods may be utilized on or under water, such as saline seawater, as well as in other aquatic environments. In certain embodiments, the systems and methods may be implemented on an autonomous underwater vehicle ("AUV") or an unmanned underwater vehicle ("UUV"). In other embodiments, the implementation may be performed on a surface vessel or ship that includes components of the disclosed system located at or near the underside of the vessel.

A sub-bottom profiler, or transducer, may be mounted on such vehicles or vessels in order to survey the physical properties of the seabed and characterize the surveyed information. As the sub-bottom profiler transmits sound energy in the form of a short pulse towards the seabed, the sound energy is reflected from the seabed and the subsurface sediment layers. The reflected energy intensity may depend on the different densities of the sediments, such that stronger reflected signals result from denser or harder the sediments. Upon receiving the reflected signal via a hydrophone or transducer, the received signals may be amplified and processed to generate sub-bottom profiler data. The presence of targeted objects buried in the seabed may be detected based on strong reflection returns represented in the sub-bottom profiler data. The shape and contours of a sub-bottom targeted object, or contact, may be determined based on the sub-bottom profiler data that represents a set of strong reflections in a pattern. Such representations may be exhibited in the form of a hyperbolic shape when the data is rendered in a visual display.

The targeted object may vary in size and shape, and the disclosed systems and methods may operate on varying target parameterizations. In some embodiments, points along the exterior surface of the targeted object may be defined by parametric equations used in a localization model in accordance with the disclosure. A vertical range from the sub-bottom profiler/transducer to the targeted object may be extracted from the sub-bottom profiler data. Such an extracted range measurement ($R_m$) may be based on the actual slant range ($R_s$) between the sub-bottom transducer and the targeted object responsible for the generation of the patterned set of strong reflection signals.

Predetermined parameters for targeted objects may be utilized as input to the disclosed localization model. In some embodiments, distance values or variables may be utilized in a model to localize a targeted object. Such distances may be actual, measured, extracted, derived and/or predetermined. In certain embodiments, squared distances may be utilized by a localization model using derivative matrix equations. Derivatives determined in accordance with the disclosure enable the localization model to map arbitrary points for targeted objects.

In certain embodiments, the disclosure localization model may incorporate a predetermined steps that implement the Levenberg-Marquardt non-linear least squares formulae and derivative matrixes to assess the sub-bottom profiler data in order to detect and identify the targeted object. Through the application of such a model, all data points may be considered to determine the location and identify of a buried object. In some embodiments, the use of this model to examine all data reduces the influences of artifacts and prior inferences, while increasing the amount of data points that may be utilized in the detection and identification of a buried object.

According to another technical advantage of the disclosure, the systems and methods may detect objects fully buried fifty meters beneath the seafloor. The range may depend on the scanning strength of the equipment. In some embodiments, sound navigation and ranging ("sonar") techniques may be incorporated to use sound propagation to detect buried objects. The use of sonar technology reduces the amount of equipment needed to implement the present disclosures. When less equipment is required, the complexity of the process is also reduced. A less complex scanning process saves time and allows users to gather more data, while reducing potential points of failure.

Sidescan sonar may also be incorporated by the disclosed system. Sidescan data may be utilized by the system to complement the sub-bottom profiler data, in order to generate a representation of shallow portions of the seabed. In addition, after a targeted object is detected using the disclosed localization model, sidescan sonar may be utilized by the disclosed system near the targeted object. Utilizing its multiple thrusters, the UUV or AUV may navigate towards to the targeted object in a precise and controlled manner in order to improve the accuracy of the measurements, the parameters, the sub-bottom profiler data and the localization analysis. In an embodiment, the UUV or AUV may be equipped with robotic tools to expose a portion of the targeted object. The vehicle may include various excavation tools such as a shovel, drill, jackhammer, crowbar, saw or grinder. Such tools may be hydraulic, pneumatic, piezoelectric and/or ultrasonic. During the use of the excavation tools, the multiple thrusters of the vehicle may be utilized to stabilize the position of the vehicle in relation to the targeted object in order to avoid damaging the object and to effectuate the excavation. Underwater explosives and blasting mechanisms may be set up by a vehicle and remotely detonated from a safe distance in controlled environments. If a portion of the targeted object is uncovered by such excavation means, sidescan sonar may be utilized by the disclosed system to identify the targeted object based on sidescan data. Further advantages and features of the present disclosure will be illustrate in the drawings and described in detail below.

BRIEF DESCRIPTION OF THE DRAWINGS

The foregoing and other objects, features, and advantages for embodiments of the present disclosure will be apparent from the following more particular description of the embodiments as illustrated in the accompanying drawings, in which reference characters refer to the same parts throughout the various views. The drawings are not necessarily to scale, emphasis instead being placed upon illustrating principles of the present disclosure.

FIG. 8 illustrates an example of a model for the localization engine implemented by the exemplary system depicted in FIG. 1, in accordance with certain embodiments of the present disclosure.

FIG. 9 illustrates an example of derivative matrix equations for implementing a model for the localization engine of the exemplary system depicted in FIG. 1, in accordance with certain embodiments of the present disclosure.

FIGS. 10-12 illustrate exemplary graphical output generated the localization engine of the exemplary system depicted in FIG. 1, in accordance with certain embodiments of the present disclosure.

DETAILED DESCRIPTION OF THE DISCLOSURE

Reference will now be made in detail to the embodiments of the present disclosure, examples of which are illustrated in the accompanying drawings.

Figure 1:
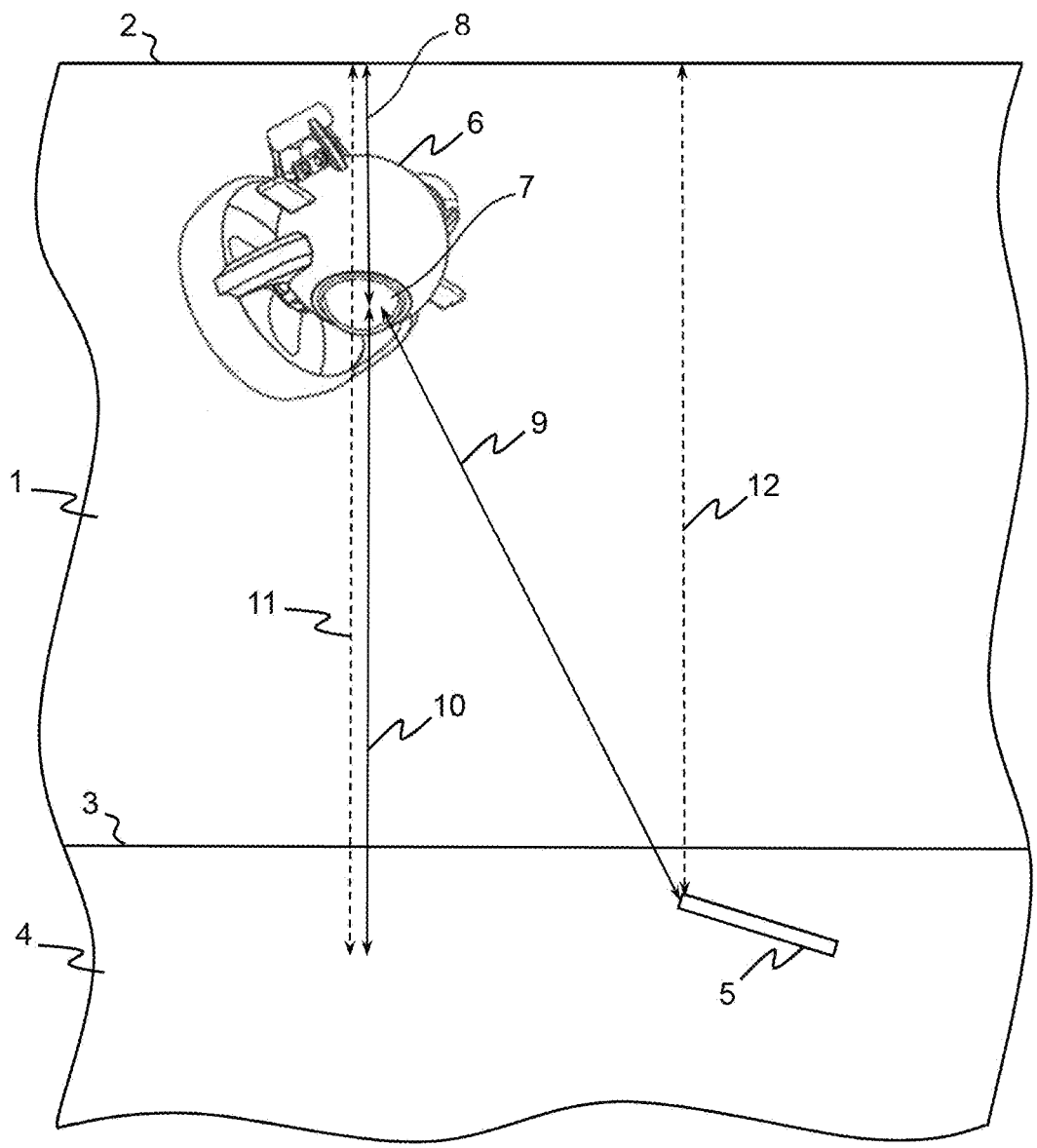
FIG. 1 is a diagram illustrating an exemplary implementation of a system aboard an unmanned underwater vehicle for detecting and identifying a targeted object buried in the seabed, in accordance with certain embodiments of the present disclosure.

The present disclosure may be embodied in various forms, including a system, a method, or a computer readable medium for scanning, within the sea 1 under the water surface 2, the seabed 4 to detect and identify targeted objects 5 buried beneath the seafloor 3. As shown in FIG. 1, such systems and methods may be implemented by an UUV 6. The UUV 6 includes a sub-bottom profiler or transducer 7 that may survey the seabed 4 and detect reflected signals received from any sub-bottom objects 5 or contacts 5 that lie beneath the seafloor 3. Sub-bottom profiler data may be generated based on the reflected signals, and graphically rendered via a display monitor 14 as shown in FIGS. 2A and 2B.

Referring back to FIG. 1, the depth of the sub-bottom profiler 7 is measured and the depth value 8 is assigned to a depth variable defined as "dep." The UUV 6 may include a plurality of sensors that provide depth, pitch and yaw data for the underwater vehicle 6. A pressure transducer may be used to determine depth, and pitch and yaw data may be obtained from tilt sensors. Such techniques and devices are described in U.S. Pat. No. 5,708,626 which is incorporated herein by reference. Sub-bottom profilers 7 for UUV 6 are described in U.S. Pat. No. 8,868,268 which is incorporated herein by reference. System and method used by underwater vehicles 6 to determine the location of targeted objects 5 lying atop the seafloor 3 are described in U.S. Pat. No. 9,432,637 which is incorporated herein by reference. The actual slant range, or distance, between the sub-bottom profiler 7 and targeted object 5 is measured and the slant range 9 is assigned to a slant range variable defined as "$R_s$." The vertical range 10 from the sub-bottom profiler 7 to the targeted object 5 may be extracted from the sub-bottom profiler data, is assigned to a vertical range measurement variable defined as "$R_m$." Accordingly, in some embodiments, the extracted range measurement ($R_m$) 10 may be based on the actual slant range ($R_s$) 9. As such, the depth measurement (dep) 8 together with its corresponding vertical range measurement ($R_m$) 10 is set to equal a vertical measurement ($Z_{meas}$) 11 for the targeted object 5, while the actual vertical depth 12 of the targeted object 5 is defined as $Z_{act}$.

Figure 2A:
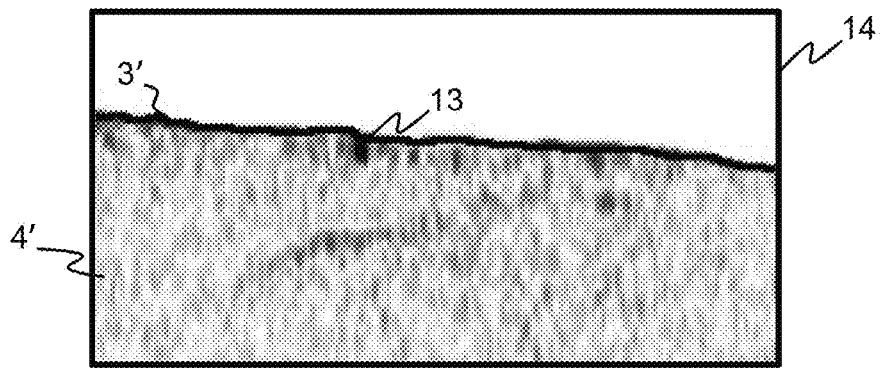
FIGS. 2A and 2B are graphical representations rendered via a display monitor illustrating images of regions of the seabed and a hyperbolically-shaped sub-bottom contact generated from sub-bottom profiler data based on reflected signals received by the transducer, in accordance with certain embodiments of the present disclosure.
Figure 2B:
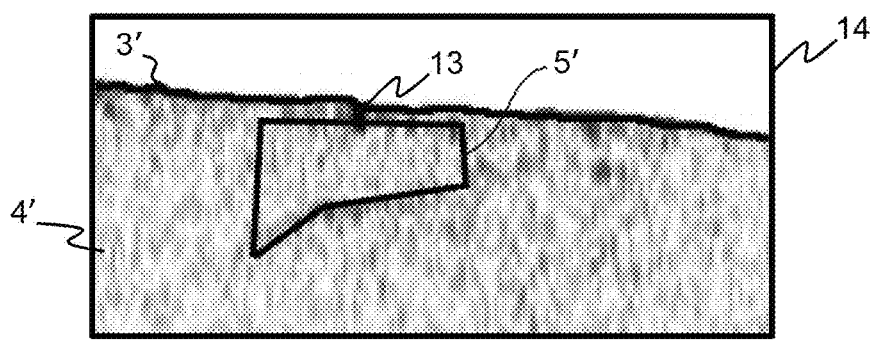

FIG. 2A illustrates the graphical representation of the seabed 4 as surveyed by the sub-bottom profiler 7. The pixelated images of the seafloor representation 3' and the seabed representation 4' are rendered on a display monitor 14. In accordance with an embodiment, a hole 13 drilled through the seafloor 3 may also be rendered. Such a hole 13 may be facilitated by excavating tools of an UUV 6, as discussed below. A portion of the targeted object 5 may be uncovered by excavation, so that a sidescan sonar may be utilized by the disclosed system to identify the targeted object 5 based on sidescan data in addition to sub-bottom profiler data. FIG. 2B illustrates the representation of targeted object 5'.

Figure 3:
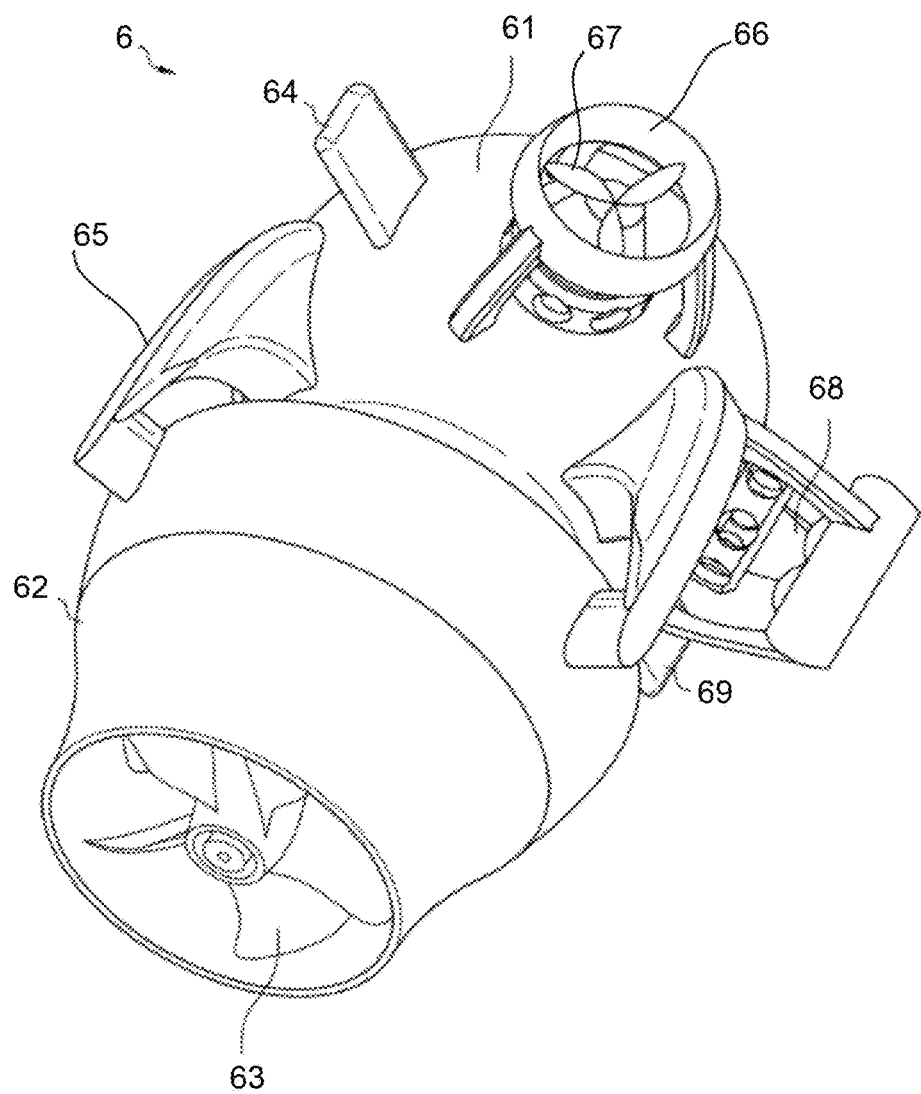
FIG. 3 is a diagram illustrating an embodiment of an unmanned underwater vehicle adapted to implement the exemplary system depicted in FIG. 1, in accordance with certain embodiments of the present disclosure.

As shown in FIG. 3, the UUV 6 may comprise a sphere 61 and control surfaces 64. Sensors and the sub-bottom profiler/transducer 7 illustrated in FIG. 1 may be incorporated into the exterior surface of the spherical UUV 6. Additionally, the UUV 6 may include a propeller 63 and a plurality of thrusters 68. A change in the speed of any of the thrusters 68 or the propeller 63 results in a thrust vector that can reposition the UUV 6 or maintain its station by counterbalancing other forces. During excavation of the seafloor 3 to expose a targeted object 5, the thrusters 68 and the propeller 63 may be controlled to generate thrust vectors in predetermined directions necessary to facilitate the excavation. The control surfaces 64 also assist with stabilizing the UUV 6. The UUV 6 may include a shroud 62 to protect the propeller 63 from debris resulting from the excavation. The thrusters 68 may also comprise propellers 67 surrounded by shrouds 66. In an embodiment, connectors 65 may be utilized for attaching and detaching the shroud 62 and the propeller 63 from the spherical body of the UUV 6. Such members may be removed and replaced if damaged. The UUV 6 may include various tools 69 for excavation, such as a shovel, drill, jackhammer, crowbar, saw or grinder. Such excavation tools 69 may also be modularly attached and interchanged via the joining mechanisms described in U.S. Patent Publication No. 2021/0179242 which is incorporated herein by reference.

Figure 4:
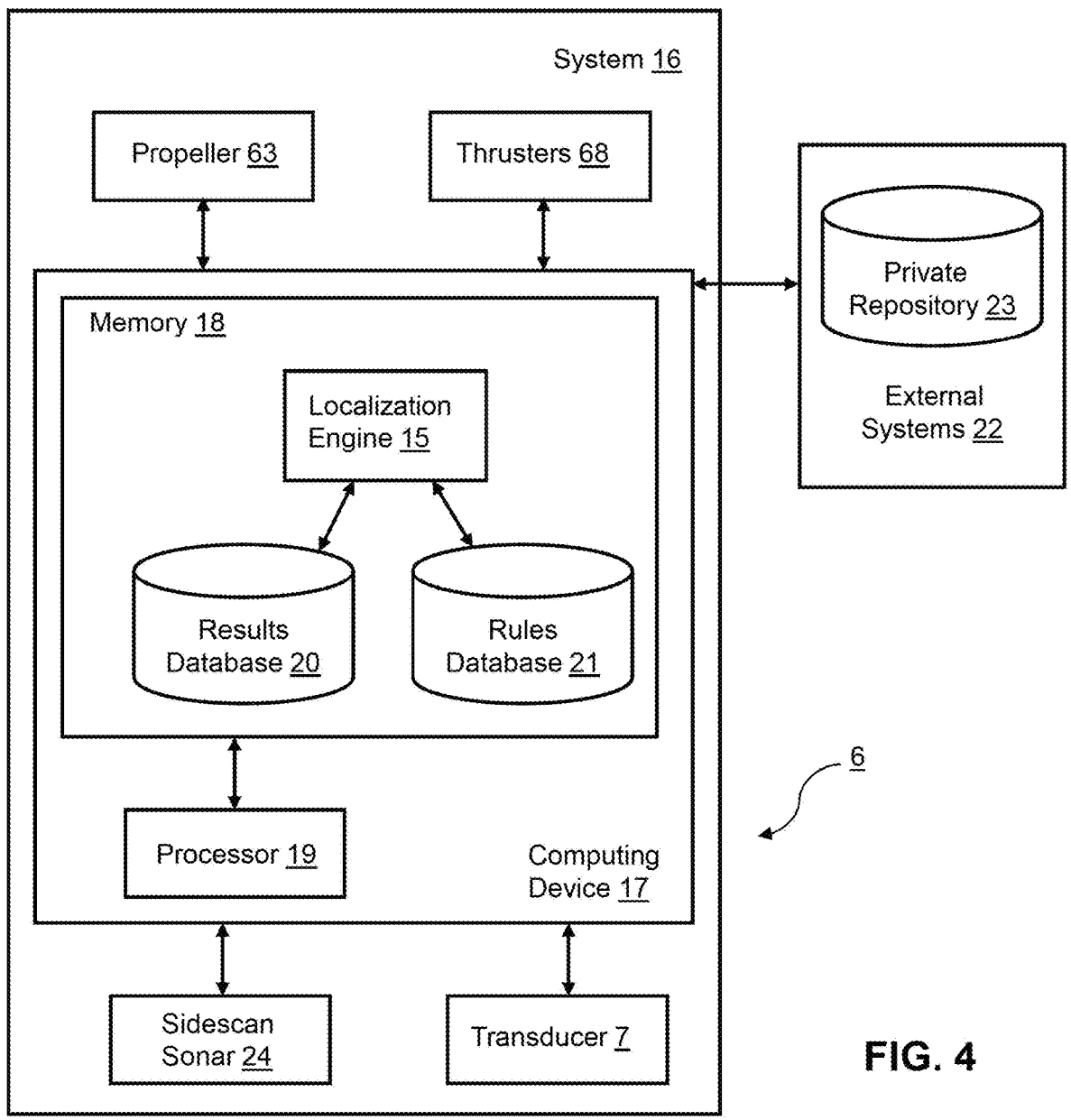
FIG. 4 is a block diagram illustrating components of the exemplary system depicted in FIG. 1, in accordance with certain embodiments of the present disclosure.

An embodiment of the disclosed system that may be implemented in many different ways, using various components and modules, including any combination of circuitry described herein, such as hardware, software, middleware, application program interfaces (APIs), and/or other components for implementing the corresponding features of the circuitry. The system may include a localization engine 15, as further described below. In an embodiment, as shown in FIG. 4, the system 16 aboard the vessel or vehicle 6 may include a computing device 17, which may include a memory 18 and a processor 19. The system 16 may communicate with remote graphical user interfaces (GUIs) used to facilitate the importation and exportation of data, as well as overriding the controls and operation of the UUV 6. As such, users and administrators (admins) may remotely interface with the system 16 via the GUI. In some embodiments, the memory 18 may include the components and modules of the system 16, including the localization engine 15. The localization engine 15 may be configured: to control the sub-bottom profiler/transducer 7 to scan the seabed 4; detect, locate and identify a targeted object 5; generate output data; and, generate visual images, including the seafloor representation 3', the seabed representation 4' and the targeted object representation 5'. The images may transmitted to user and admin for further visual observation, and may represent the real-time state of the environment surrounding the targeted object 5. In addition, the localization engine 15 may store the generated output data and images in a results database 20. The system 16 may also include a rules database 21 that stores the rules (not shown) utilized to detect and identify a targeted object 5 buried beneath the seafloor 3. In the databases 20/21 may be relational databases, such as a MySQL database, or an object-relational database, such as a PostgresSQL database. The databases 20/21 may be stored in the memory 18 of the system 16, or distributed across multiple devices, processing systems, or repositories. For example, the computing device 17 may be configured to communicate with various external systems 22 that may comprise private repositories 23. The computing device 17 may communicate with, and control, the transducer 7 and the sidescan sonar 24. The computing device 17 may also controller the propeller 63 and the plurality of thrusters 68.

Figure 5:
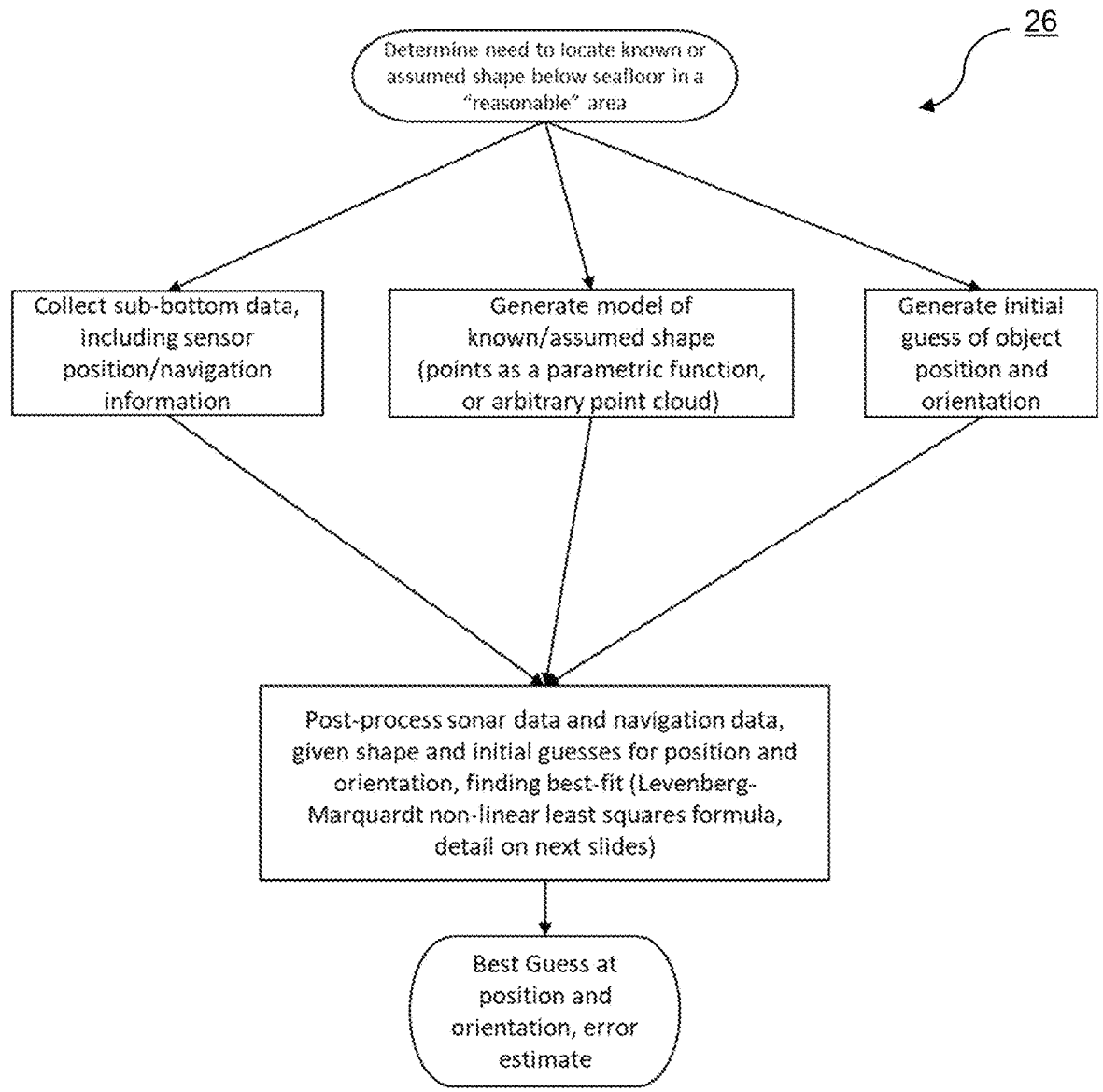
FIG. 5 is a flowchart illustrating an embodiment for a method performed by the exemplary system depicted in FIG. 1, in accordance with certain embodiments of the present disclosure.

FIG. 5 illustrates a localization method 26 performed by an UUV 6. The UUV 6 may be instructed to find a targeted object 5 believed to be buried in underwater sediments, such as sea sediments, in a targeted area. For example, the targeted area may be a ten-meter square area, or a two-meter by fifty-meter area. A targeted area may be predetermined based on a predetermined type of targeted object 5 included in the rules database 21 of the UUV 6. Scanned data may be collected by the sub-bottom profiler 7. A predetermined shape of a buried targeted object may generated. The initial location and orientation of a targeted object 5 is predetermined. Scanned data, a predetermined shape of a buried object, and predetermined location may be processed by the localization method 26. This method 26 generates a best-fit values for the position and orientation of a targeted object 5, as well as error margins.

The localization method 26 utilizes the beam-width effects of the sub-bottom profiler 7. Because of the aperture of the sub-bottom profiler 7, targeted objects 5 resulting in strong enough reflections located anywhere within the beam of the sonar for a given ping will result in a return in the sub-bottom data. Because returns ranges are based on acoustic travel time, returns from objects 7 off the main axis of the sub-bottom aperture will have longer travel times and thus appear deeper than their corresponding profiler data. When the sound speed is constant, the vertical range measurement ($R_m$) 10 extracted from the sub-bottom data is equal to the actual slant range ($R_s$) 9 between the sub-bottom transducer 7 and the targeted object 5 creating the reflection. Based on these relationships, when the reflection comes from the closest point on the target 5 and there is no tidal change over the duration of data collection, a non-linear least squares model may be utilized to locate a targeted object 5 based on collected sub-bottom data.

In some embodiments, the targeted object 5 is predetermined to have a linear shape. For linear targeted objects 5, the targeted object 5 may be parameterized by six features: x, y, z, bearing, plunge and length. The x, y, z coordinates provide the location of one endpoint of the targeted object 5, in a local tangent plane Cartesian coordinate system. The bearing may be the angle the line of the targeted object 5 from due north, in a counterclockwise positive direction. The plunge may be the angle the line of the targeted object 5 with the horizontal sea surface 2. The length corresponds to the overall length of the targeted object 5. Points on the target are defined by parametric equations:

$$xp = x + t * \sin(\theta) * \cos(\varphi)$$

$$yp = y + t * \cos(\theta) * \cos(\varphi)$$

$$zp = z + t * \sin(\varphi)$$

where t is the length along the target (0<t<length).

The system model may be defined as a function of the parameters for the targeted object 5, excluding length which may be predetermined or later determined using sidescan sonar after excavation of at least a portion of the targeted object 5. The system model may represent the vertical range measurement ($R_m$) 10 squared may be based on the actual slant range ($R_s$) 9 squared between the sub-bottom profiler 7 and target object 5. While the squared distances are used in some embodiments using derivatives in the least squares solution, actual distances may also be used in accordance with the present disclosure. The depth measurement (dep) 8 together with its corresponding vertical range measurement ($R_m$) 10 may be set to equal a vertical measurement ($Z_{meas}$) for the targeted object 5. The system model may comprise:

$$F_i(x, y, z, \theta, \phi) = R_m^2 - R_s^2 =$$
$$[Z_{meas,i} - dep_i]^2 -$$
$$[(x + t_i^* \sin\theta\cos\phi - x_{v,i})^2 + (y + t_i^* \cos\theta\cos\phi - y_{v,i})^2 +$$
$$(z + t_i^* \sin\phi - dep_i)^2] = 0$$

where $x_v$, $y_v$ and dep is location and depth of the sub-bottom profiler 7 corresponding to the vertical measurement of $Z_{meas}$ 11. The subscript i indicates the index of each data point in which a strong reflection was measured. The values $t_i$ are selected such that $R_s$ is minimized over 0<t<target length using the equation:

$$t_i = ((x_{v,i} - x) * \sin\theta \cos\phi + (y_{v,i} - y) * \cos\theta \cos\phi + (dep_i - z) * \sin(\phi)) / (\sin^2\theta \cos^2\phi + \cos^2\theta \cos^2\phi + \sin^2\phi)$$

The predetermined location of the targeted object 5 is then determined by minimizing:

$$\Sigma_i \|F_i(x,y,z,\theta,\phi)\|^2$$

over a set of sub-bottom contact data.

The minimization may be facilitated by incorporating the non-linear least squares Levenberg-Marquardt optimization method into the disclosed method 26. In an embodiment, the steps of a localization method 26 may include:

1) Define initial predetermined parameters $X_0 = [x_0, y_0, z_0, \theta_0, \varphi_0]$ and damping factor $\lambda$
2) Iterate the following until X converges:
   a. For each i, find $t_i$ that minimizes:
   $$\text{sqrt}[(x_k + t_i * \sin(\theta_k) * \cos(\varphi_k) - x_{v,i})^2 + (y_k + t_i * \cos(\theta_k) * \cos(\varphi_k) - y_{v,i})^2 + (z_k + t_i * \sin(\theta_k) + dep_i)^2]$$
   b. Compute $F_i(X_k)$ for each i
   c. Compute derivative matrix $dF_k$ for $F_i(X_k)$
   d. Compute new predetermined values for $X_{k+1}$ and $J_{k+1}$
   $$X_{k+1} = X_k - (dF_k^T * dF_k + \lambda I_5)^{-1} * dF_k^T * F(X_k)$$
   e. If $J_{k+1} < J_k$:
      Accept update to $X_{k+1}$
      set $\lambda = 0.8 * \lambda$ (or otherwise reduce lambda)
   Else:
      Reject update
      set $\lambda = 2 * \lambda$ (or otherwise increase lambda)
   f. Compute change in predetermined values
   $$dX_k = X_{k+1} - X_k$$
   g. Test for convergence (max(|$dX_k$|)<0.001)
   h. If not converged, repeat iteration unless the desired maximum number of iterations has been completed
3) Once converged compute quality of fit for final $X_k$:
$$J_{min} = \Sigma_i |F_i(x_k, y_k, z_k, \theta_k, \phi_5)|^2$$
4) Normalize quality by number of data points to aid in comparison of different inputs
$$J_{norm} = J_{min}/n$$

where n is the number of sub-bottom data points.

When length of the targeted object 5 is unknown, the solution can be determined for varying parameters for length of the targeted object 5. The length that yields the lowest value of $J_{norm}$ or at which $J_{norm}$ converges to a minimum value is the most likely value of length.

A script may be written to process sub-bottom data using the aforementioned method 26, taking as input a set of sub-bottom contacts 5" including the location and measured depth of each contact 5". The output gives the optimal fit values of the target parameters based on the contacts 5" and shows an x/y plot of each location for a contact 5" contact with the targeted area as well as a comparison of each actual measured contact verses the expected return for the resulting contact 5".

Figure 6:
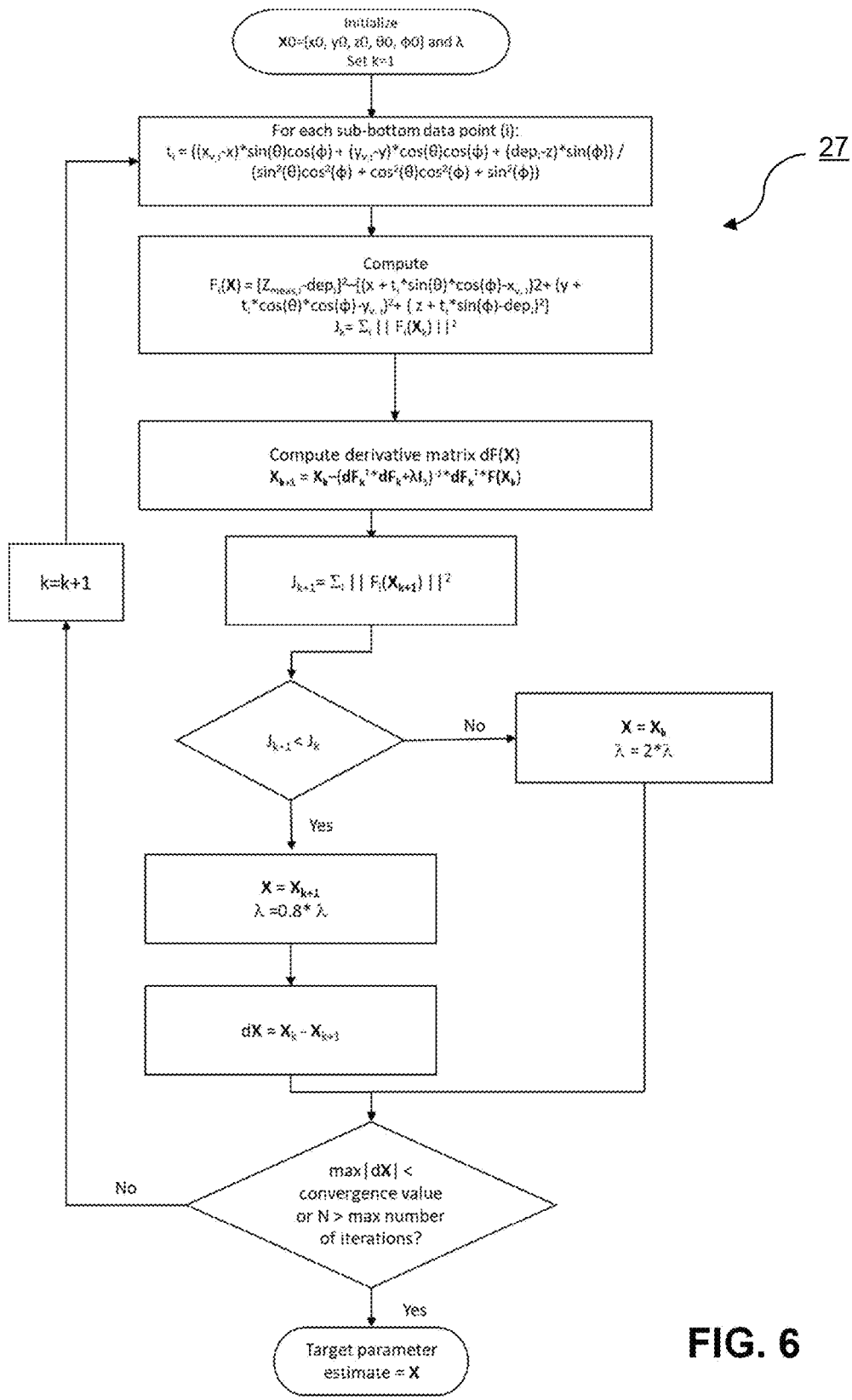
FIG. 6 is a flow diagram illustrating an example of the steps implemented by the localization engine for the exemplary system depicted in FIG. 1, in accordance with certain embodiments of the present disclosure.
Figure 7:
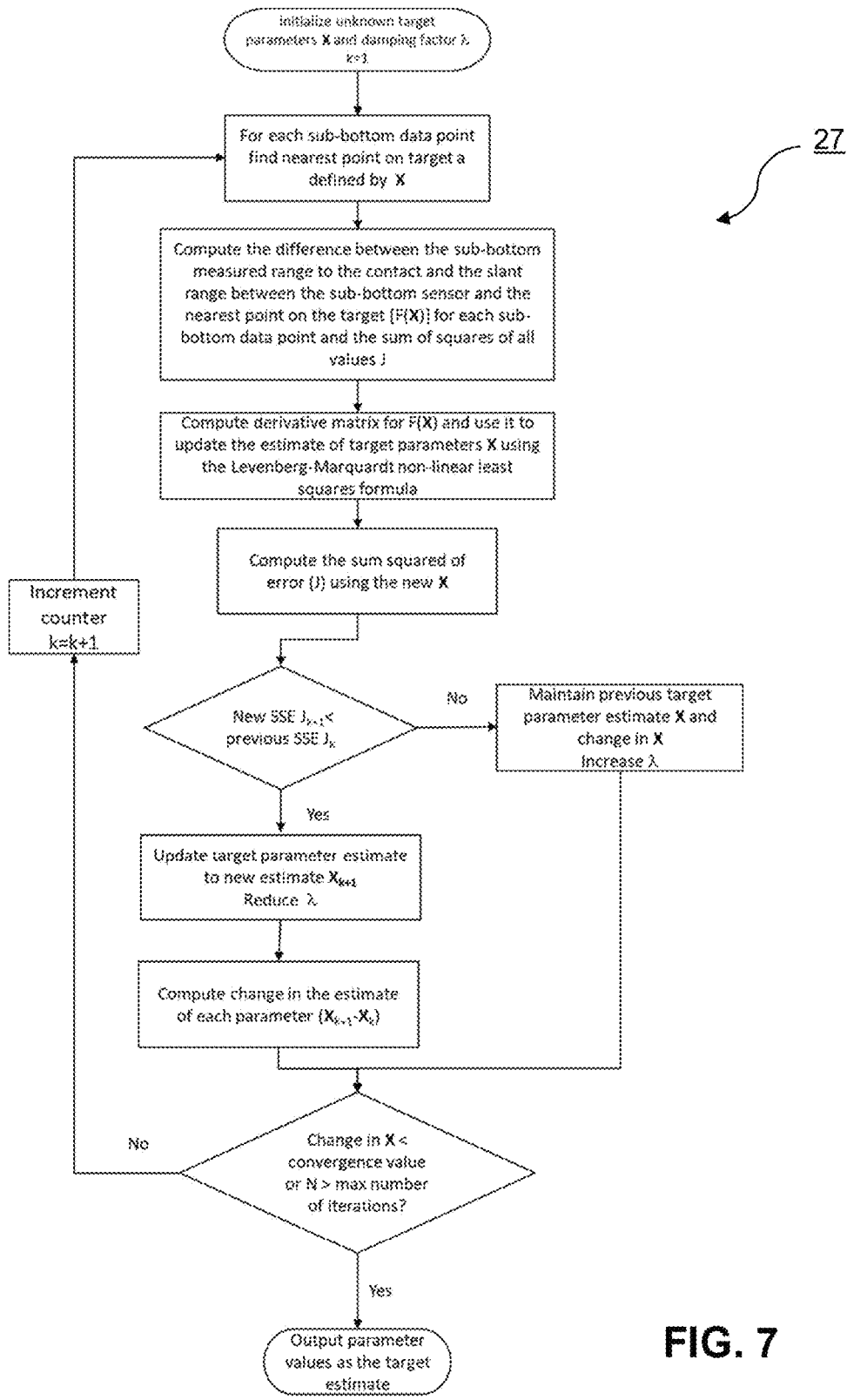
FIG. 7 is a flow diagram illustrating an embodiment of a method for implementing the exemplary system depicted in FIG. 1, in accordance with certain embodiments of the present disclosure.

FIG. 6 illustrates exemplary steps 27 implemented by a localization engine 15, as directed by the aforementioned model applied to the localization method 26. FIG. 7 also illustrates examples of steps 27 for a method 26 implemented by a localization engine 15. A predetermined location for a buried object 5 is defined. As set forth in the steps 27, X represents the predetermined location of a buried object 5. K is a counter for a number of iterations the localization engine 15 will be model the data, and is initially set at 1. The number of iterations the localization engine 15 will run may be predetermined. $\lambda$ is a tuning, or dampening, factor for steps performed by the localization engine 15, and may be converted into a derivative. $\lambda$ may be increased or decreased, dependent on the number and size of errors each iteration. The amount $\lambda$ is increased or decreased may be predetermined. A current value X is denoted $X_k$ in the iterations of the steps.

The seabed may be surveyed by the sub-bottom profiler, and profiler data is collected. Using sub-bottom data points for a predetermined targeted areas based on X, the distance from a profiler/transducer may be determined. This step identifies the shortest distance between the scanned area and the predetermined targeted area. Scanned sub-bottom profiler data, a predetermined shape of a buried object, and a predetermined location of a buried object represented by X are processed by the steps 27 of the method 26 implemented by a localization engine 15. The steps 27 may determine the difference between sub-bottom profiler data measurements, the depth from a SONAR-baring vehicle with sub-bottom profiler data, a slant range distance formula of a vehicle to X, and the nearest point from the previous step for each data point after a prior run of the steps 27. These values are squared and summed. The steps 27 also sum the squares of errors, or the values of J denoted as $J_k$, where k equals the iteration of the steps 27. If K equals 5, then the steps 27 have run five times and $J_k$ is utilized in further steps 27.

In some embodiments, a derivative matrix is determined based on the current X value, or $X_k$. The steps 27 are based on $J_k$ when a derivative matrix for a current $X_k$ is utilized. A new value of $X_k$ is determined. Values of $J_k$ may determine whether a new current $X_k$ value has a greater or lesser chance of being correct. The steps 27 may apply the Levenberg-Marquardt non-linear least squares formula based on the new parameters resulting from determining a derivative matrix of a current $X_k$, value denoted as $X_{k+1}$.

The steps 27 may determine the sum of the squares of error values of J based a new $X_{k+1}$. The sum of squares of error values of J using a new $X_{k+1}$ is determined, and new error values of J denoted as $J_{k+1}$ are determined. New $J_{k+1}$, also referred to as new summed squares of errors, may be compared to an immediate previous error values of J to determine the degree of error. If $J_{k+1}$ is larger than $J_k$, the next iterations of the steps 27 may increase λ, a dampening factor, to a smaller adjustment and continue to use $X_k$. If $J_{k+1}$ is smaller than $J_k$, the next iterations of the steps 27 may update $X_k$ to $X_{k+1}$ and reduces X. A smaller $J_{k+1}$ may be desired, as a smaller $J_{k+1}$ indicates scanning the seabed in a correct direction.

The change in the X value is determined by the steps 27. A new value of X may be subtracted from an immediate previous value of X, or $X_{k+1}$-$X_k$. The steps 27 may examine the change in X against a convergence value. A convergence value may be predetermined. If the change in X is more than the convergence value, or if k is less than the number of maximum iterations, $X_{k+1}$ is returned to the beginning of the iteration and becomes $X_k$ in the formulae. If X is less than the convergence number, or k is greater than the number of maximum iterations, steps stops and produces an output parameter value. Output parameter values are a best-fit values for the location of a buried object.

FIG. 8 illustrates a model for the localization engine 15. This system model is used to simplify derivatives in the non-linear least squares solutions. The model is based on a function of the target parameters, excluding length or a current X values, $X_k$. The model is based on an equation expressing that the vertical range measurement ($R_m$) 10 squared for the data may be based on the actual slant range ($R_s$) 9 squared between the sub-bottom profiler 6 and the buried targeted object 5.

FIG. 9 illustrates derivative matrix equations for implementing a model for the localization engine 15. The derivative matrix equations may be used in the non-linear least squares formula in the aforementioned steps 27. Derivative matrix equations may be used to update the current value X value, $X_{k+1}$, to update a next scanning location.

FIG. 10 illustrates a two-dimensional graphs of each contact 5", as generated the localization engine. These contacts 5" are a series of predetermined iterations of the steps 27 discussed above. Darker lines represent best-fit values from the localization method 26, while the lighter lines represent scanned data. FIG. 11 illustrates an exemplary parameters that may be used in the aforementioned steps 27. As scans of the seabed are three-dimensionally performed, X, Y, and Z coordinates may be utilized in the localization method 26. X-coordinates, or length, may be used as variables in the steps 27. Bearing is the angle of a current location in relation to true north. The J min and the root-mean-square (rms) values may be the errors calculated in the steps 27. A best-fit line may be illustrated in a two-dimensional graph, as shown in FIG. 12. The best-fit line may overlay all contacts 5" on the graph. This best-fit line may reflect the best-fit values of all X values from the steps 27 implemented by a localization engine 15. The best-fit line may provide a best-fit values for a location of a buried object and its orientation beneath sediments. A localization result may be output from the localization method 26, which may comprise the best-fit values.

In order to locate a buried fiber optic cable 5, in an embodiment, a targeted area is determined based on the location where at least a portion of the buried cable 5 was known to exist, a current X value, along with Y and Z coordinates for scanning and determining the shape of the a buried fiber optic cable 5. During a sonar scan, an X-value will change, as lateral (Y) and depth (Z) coordinates are remain constant. The model also determines whether a dampening factor λ will be increased or decreased for errors. A predetermined number of iterations of the steps 27 is set, as well as a convergence number to end the iterations of the steps 27. The UUV 6 may utilize sonar to scans a predetermined targeted area of the seabed. For example, the buried fiber optic cable 5 may be found in a targeted area of one-meter wide, ten-meters long, and five-meters deep. One-meter and five-meters are coordinates Y and Z, respectively for this example. As a UUV travels, a SONAR scans and generates pings that bounce off of sediments and the object 5, returning to a SONAR receiver 7. Each ping return is a set of data points. High pitched ping returns typically non-organic material, such as a buried fiber optic cable 5. Low pitched ping returns generally organic material, such as sea sediments. The returned pings are also referred to as sub-bottom data. The distance between a UUV 6 and the targeted object 5 may be recorded, along with the depth of the UUV 6, and the slant range distance ($R_s$) 9 from the UUV 6 to a location of a buried fiber optic cable 5.

The steps 27 may determine the shortest distance between a targeted area for a buried fiber optic cable 5 and the scans from the sub-bottom profiler 7, as data is collected. A predetermined shape of a buried fiber optic cable 5 may be used by the steps 27, along with a targeted area for a buried fiber optic cable 5.

Steps 27 may compute the differences between sub-bottom data measurements, such as $R_m$ 10, the depth of the UUV 6, the slant range distance $R_s$ 9 from the UUV 6 to a targeted area for a buried fiber optic cable 5, and the differences between the current targeted area and a previous targeted area. If this is the first run of the steps 27, the distance between the current and previous targeted area is the current targeted area of a buried fiber optic cable 5.

The steps 27 may square and sum all of the differences, and the errors, of where a fiber optic cable 5 may not be. The steps 27 may use a squared differences and a targeted area of a buried fiber optic cable 5 to calculate a derivative matrix. The product of a derivative matrix is a new value of X, or a new targeted area for the buried fiber optics cable 5. A new targeted area may be used by the Levenberg-Marquardt non-linear least squares formula. A new summed square of errors may be determined for a new targeted area. If a new squared error is less than the immediate previous error, a new targeted area of a buried fiber optic cable 5 is used by the steps 27 as the next targeted area at the beginning of the subsequent iteration of the steps 27. The steps 27 update for the new targeted area of a buried fiber optic cable 5, and reduce the dampening factor λ by the predetermined amount at the start of buried object localization process 26.

The steps 27 may determine the difference between a new targeted area and the preceding targeted area. If the difference is less than a predetermined convergence value, the steps 27 sue the new targeted area of the buried fiber optic cable 5 as a targeted contact 5" of a buried fiber optic cable 5. A contact 5" represents the determined location of a portion of a buried object 5. The localization method may include additional steps to excavate the targeted area and perform sidescans, as described above.

The steps 27 may run as many times as there are scans, creating many contacts 5". The contacts 5" may be plotted on a two-dimensional graph, as shown in FIG. 10. A best-fit line may be determined where a buried fiber optic cable 5 most likely is located under sea sediments.

In some embodiments, the computer device 17 may include communication interfaces, system circuitry, input/output (I/O) interface circuitry, and display circuitry. The communication interfaces may include wireless transmitters and receivers (herein, "transceivers") and any antennas used by the transmit-and-receive circuitry of the transceivers. The transceivers and antennas may support Wi-Fi network communications, for instance, under any version of IEEE 802.11, e. g., 802.11n or 802.11ac, or other wireless protocols such as Bluetooth, Wi-Fi, WLAN, cellular (4G, LTE/A). The communication interfaces may also include serial interfaces, such as universal serial bus (USB), serial ATA, IEEE 1394, lighting port, I$^2$C, slimBus, or other serial interfaces. The communication interfaces may also include wireline transceivers to support wired communication protocols. The wireline transceivers may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry may include any combination of hardware, software, firmware, APIs, and/or other circuitry. The system circuitry may be implemented, for example, with one or more systems on a chip (SoC), servers, application specific integrated circuits (ASIC), field programmable gate arrays (FPGA), microprocessors, discrete analog and digital circuits, and other circuitry. The system circuitry may implement any desired functionality of the system 16. As just one example, the system circuitry may include one or more instruction processor 19 and memory 18. The processor 19 may be one or more devices operable to execute logic. The logic may include computer executable instructions or computer code embodied in the memory 18 or in other memory that when executed by the processor 19, cause the processor 19 to perform the features implemented by the logic. The computer code may include instructions executable with the processor 19. Logic, such as programs or circuitry, may be combined or split among multiple programs, distributed across several memories and processors, and may be implemented in a library, such as a shared library (e.g., a dynamic link library or DLL).

The memory 18 stores, for example, control instructions for executing the features of the disclosed system 16. Examples of the memory 18 may include non-volatile and/or volatile memory, such as a random access memory (RAM), a read-only memory (ROM), an erasable programmable read-only memory (EPROM), or flash memory. Alternatively or in addition, the memory 18 may include an optical, magnetic (hard-drive) or any other form of data storage device. In one implementation, the processor 19 executes the control instructions to carry out any desired functionality for the disclosed system 16, including without limitation those attributed to data/reflection receiver (e.g., relating to the data receiver circuitry), image generation, and/or profiler results generation. The control parameters may provide and specify configuration and operating options for the control instructions, and other functionality of the computer device 16.

The computer device 17 may further include various data sources, as described herein. Each of the databases that are included in the data sources may be accessed by the system 16 to obtain data for consideration during any one or more of the processes described herein. For example, the data receiver circuitry may access the data sources to obtain the information for generating the images and the reflection returns. In an embodiment, a data receiver circuitry may be configured to receive reflected signals.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

While the present disclosure has been particularly shown and described with reference to an embodiment thereof, it will be understood by those skilled in the art that various changes in form and details may be made therein without departing from the spirit and scope of the present disclosure. Although some of the drawings illustrate a number of operations in a particular order, operations that are not order-dependent may be reordered and other operations may be combined or broken out. While some reordering or other groupings are specifically mentioned, others will be apparent to those of ordinary skill in the art and so do not present an exhaustive list of alternatives.

What is claimed is:

1. A method for localization of objects buried in a seabed, comprising the steps of:
   scanning, via a sub-bottom profiler, a targeted area of the seabed for a targeted object;
   receiving sub-bottom profiler data from the sub-bottom profiler;
   generating, via a localization engine, a derivative matrix based on the received sub-bottom profiler data; and,
   determining a location of the targeted object using a Levenberg-Marquardt non-linear least squares method based on the derivative matrix.

2. The method of claim 1, wherein the derivative matrix comprises a set of squared values representing distance measurements derived from the sub-bottom profiler data.

3. The method of claim 2, wherein the distance measurements comprise a vertical range based on a slant range, the slant range measured from the sub-bottom profiler to the targeted object.

4. The method of claim 1, further comprising the steps of:
   adjusting the derivative matrix based on the location determination from Levenberg-Marquardt non-linear least squares method; and,
   updating the location determination of the targeted object based on the adjusted derivative matrix.

5. The method of claim 1, wherein the location determination is based on a dampening factor applied to the derivative matrix.

6. The method of claim 1, wherein the sub-bottom profiler is mounted on an underwater vehicle, wherein the underwater vehicle comprises a plurality of thrusters, the thrusters adapted to control the navigation and stability of the underwater vehicle.

7. The method of claim 6, further comprising the steps of:
   navigating to the targeted area; and,
   receiving updated sub-bottom profiler data from the sub-bottom profiler while the underwater vehicle navigates toward the targeted area.

8. The method of claim 7, further comprising the step of:
   excavating the targeted area to expose at least a portion of the targeted object, wherein the excavating step is performed by tools mounted on the underwater vehicle;
   scanning, via sidescan sonar, the exposed portion of the targeted object; and,
   identifying targeted object based on the sidescan data received from the sidescan sonar.

9. The method of claim 1, wherein the derivative matrix is generated by the localization engine using a model, wherein the model comprises a representation of the received sub-bottom profiler data.

10. The method of claim 9, wherein the model comprises:

$$F_i(x, y, z, \theta, \phi) = R_m^2 - R_s^2 =$$
$$[Z_{meas,i} - dep_i]^2 -$$
$$\left[(x + t_i^*\sin\theta\cos\phi - x_{v,i})^2 + (y + t_i^*\cos\theta\cos\phi - y_{v,i})^2 + (z + t_i^*\sin\phi - dep_i)^2\right] = 0.$$

* * * * *